(12) United States Patent
Dharanikota et al.

(10) Patent No.: US 7,801,123 B2
(45) Date of Patent: Sep. 21, 2010

(54) METHOD AND SYSTEM CONFIGURED FOR FACILITATING RESIDENTIAL BROADBAND SERVICE

(75) Inventors: Sudheer Dharanikota, Cary, NC (US); Luc Absillis, Raleigh, NC (US)

(73) Assignee: Alcatel Lucent, Paris (FR)

( * ) Notice: Subject to any disclaimer, the term of this patent is extended or adjusted under 35 U.S.C. 154(b) by 852 days.

(21) Appl. No.: 11/063,699

(22) Filed: Feb. 22, 2005

(65) Prior Publication Data
US 2005/0232228 A1 Oct. 20, 2005

Related U.S. Application Data

(60) Provisional application No. 60/562,817, filed on Apr. 16, 2004.

(51) Int. Cl.
*H04L 12/28* (2006.01)
*H04L 12/56* (2006.01)

(52) U.S. Cl. ...................... 370/389; 370/401
(58) Field of Classification Search ............... 370/351, 370/389–392, 401, 395.5, 395.53, 395.54
See application file for complete search history.

(56) References Cited

U.S. PATENT DOCUMENTS

| | | | |
|---|---|---|---|
| 7,072,346 B2* | 7/2006 | Hama | ............ 370/395.53 |
| 7,234,163 B1* | 6/2007 | Rayes et al. | ............ 726/22 |
| 2003/0026273 A1 | 2/2003 | Davison et al. | |
| 2003/0214955 A1 | 11/2003 | Kim | |
| 2004/0047320 A1* | 3/2004 | Eglin | ............ 370/338 |

* cited by examiner

*Primary Examiner*—Chirag G Shah
*Assistant Examiner*—Srinivasa R Reddivalam
(74) *Attorney, Agent, or Firm*—Galasso & Associates, LP.

(57) ABSTRACT

A method for configuring an access node to provide residential routing functionality comprising populating a fixed match forwarding table with host entries learned during authentication of a residential router instance or during IP address assignment for the residential router instance, associating the residential router instance exclusively with a respective virtual local area network (VLAN) identifier, forwarding upstream traffic dependent upon the respective VLAN identifier and forwarding downstream traffic dependent upon a host entry designated by the downstream traffic being determined. The host entry is accessed from within the fixed match forwarding table. At least one logical interface associated with the residential router instance is provided. The IP packet received on a VLAN corresponding to the VLAN identifier is limited to being forwarded to one of the logical interfaces. Forwarding the upstream traffic includes ignoring a designated destination IP address of an IP packet and forwarding the IP packet toward a default gateway dependent upon the host entry.

6 Claims, 10 Drawing Sheets

METHOD AND SYSTEM CONFIGURED FOR FACILITATING RESIDENTIAL BROADBAND SERVICE

CROSS REFERENCE TO RELATED APPLICATIONS

This patent application claims priority to U.S. Provisional Patent Application having Ser. No. 60/562,817 filed Apr. 16, 2004, entitled "Residential Routing", having a common applicant herewith and being incorporated herein in its entirety by reference.

FIELD OF THE DISCLOSURE

The disclosures made herein relate generally to data communication within a computer network and, more particularly, to methods and systems configured for facilitating residential broadband service.

BACKGROUND

Broadband access to the Internet offers significantly increased speed and availability when compared to dial-up (i.e., or narrowband) access. Broadband is a provided via a dedicated connection, thus making it a relatively 'always-on connection'. Generally, a broadband access connection provides bi-directional network connection speeds of at least about 200,000 bits per second (bps). By contrast, a relatively fast dial-up access connection provides maximum bi-directional network connection speeds of about 56,000 bps. However, the connection speed of a typical dial-up access connection is often much slower because of imperfections on the line.

The speed and availability of broadband has contributed to the rapidly increasing demand for broadband by residential subscribers. Such service is referred to herein as residential broadband. This speed and availability enables residential broadband to support not only data service, but also video services and home entertainment services such as, for example, virtual reality gaming, downloadable music and video, multimedia presentations, VoIP (Voice over IP) and other services that require relatively a high-speed connection to provide a suitable quality-of-service.

Due in part to increased demands for and expectations of residential broadband, the landscape for residential broadband service is changing. New types of services will require multiple classes of service levels to provide differentiated treatment for high-quality services. Aggregation networks for residential broadband traffic will optimally move from ATM (asynchronous transfer mode) based networks to Ethernet-based aggregation networks. Additionally, new services might introduce alternative subscriber management and auto-configuration requirements.

The transition to an Ethernet aggregation network will have a particularly significant impact on the way services are delivered over the aggregation network. In such a conventional Ethernet aggregation network, access nodes with Ethernet-based network interfaces can either be restricted to operate only at the Ethernet layer, a pure layer-2, or work as full router, which significantly limits the ability to offer IP (Internet Protocol) forwarding flexibility and security in the access node while retaining the usage of a layer-2 aggregation network. Accordingly, the use of a broadcast medium (e.g., Ethernet) in combination with a point-to-point access technology for mass deployment poses a variety of security and scalability challenges. These challenges include, are not be limited to, suitable implementation of isolating a service subscriber for traffic forwarding, isolating the service subscriber for security reasons and isolating the service subscriber for billing.

Standard routing with proxy ARP (Address Resolution Protocol) in the access node represents a conventional approach for implementing residential broadband service with an Ethernet based aggregation network. Such standard routing with proxy ARP is accomplished by implementing Ethernet ARP under RFC (Request For Comments) 1027 via subnet gateways to permit hosts on the connected subnets to communicate without being aware of the existence of subnets (i.e., using Proxy ARP). Accordingly, such proxy ARP allows a network element such as a router, which is physically located on one network, appear to be logically part of a different physical network connected to the same host (e.g., router). Typically, proxy ARP allows a machine with a public IP address on a private network to be hid behind a router, and still have the machine appear to be on the public network "in front of" the router. The router proxys ARP requests and all network traffic to and from the hidden machine to make this fiction possible.

However, there are a number of potential problems with the use of proxy ARP. These problems include, but are not limited to, difficulties in protecting against attacks, requiring undesirable amounts of processing power, having a relatively complex configuration and making it relatively difficult to block direct user-to-user communication. Additionally, constraints on IP address allocation schemes often result in inefficient use of address space and complex configuration.

Therefore, an approach for implementing residential broadband service with an Ethernet-based aggregation network in a manner that at least partially overcomes shortcomings associated with conventional approaches for implementing residential broadband service with an Ethernet-based aggregation network would be advantageous, useful and novel.

SUMMARY OF THE DISCLOSURE

Embodiments of the present invention enable residential routing functionality to be facilitated in a manner that overcomes shortcomings associated with conventional approaches for facilitating residential routing functionality. More specifically, embodiments of systems and methods in accordance with the present invention provide for implementation of a residential broadband service with an Ethernet-based aggregation network where the access node is the first network element treating the traffic at the IP layer and implementation of a DiffServ (differentiated services) framework compliant behavior. The major differences of residential routing in accordance with the present invention as compared to a traditional router with proxy ARP include, but are not limited to, direction aware behavior where upstream and downstream forwarding models are completely different, a utilized forwarding table is defined in the context of a VLAN, and host addresses in the utilized forwarding table are configured through an authentication/auto-configuration process and not learned from the data flow. The advantages of these systems and methods include, but are not limited to, improved security (e.g., IP anti-spoofing, automatic blocking of direct user to user communication, etc), intuitive configuration, flexible IP address allocation and wholesale service model accommodation.

Residential routing functionality in accordance with the present invention provides a solution that advantageously addresses the changing landscape of residential broadband service delivery. Examples of such changes include, but are not limited to, new services will require multiple class of service levels to provide differentiated treatment for high quality services, aggregation networks for residential broadband traffic will move from ATM based networks to Ethernet based networks and new service might introduce alternative subscriber management and auto-configuration requirements. Conventional approaches for providing residential routing functionality are limited in their ability to address such changes in the landscape of residential broadband service delivery. Accordingly, residential routing functionality in accordance with the present invention is advantageous with respect to conventional approaches for providing residential routing functionality.

The move to an Ethernet aggregation network will especially impact the way services are delivered over the aggregation network. Conventionally, access nodes with Ethernet based network interfaces can either be restricted to operate only at the Ethernet layer or as a pure layer 2 or work as full router. The use of a broadcast medium (e.g., Ethernet) in combination with a point-to-point access technology for mass deployment poses a variety of security and scalability challenges. These challenges include, but are not limited to, facilitating isolation of an end customer for traffic forwarding, facilitating isolation of an end customer for security reasons and facilitating isolation of an end customer for billing. Advantageously, residential access bridging and residential access routing (i.e., residential routing) in accordance with the present invention address these challenges through a Layer 2 and IP forwarding mode respectfully by including specific behavior in both the control and forwarding plane without impacting standard protocol behavior. To this end, one object of residential routing functionality in accordance with the present invention is to offer IP forwarding flexibility and security in the access node while retaining the usage of a layer 2-aggregation network.

Residential routing functionality in accordance with the present invention provides for an IP forwarding scheme for a residential broadband service using a VLAN (virtual local area network) aware Ethernet aggregation network. This functionality contributes to a number of beneficial attributes. Examples of such beneficial attributes include, but are not limited to, full flexibility in subscriber management and auto-configuration models, support for PPP and DHCP based models, full flexibility in user traffic encapsulation schemes, support for PPP encapsulation (e.g., PPPoE, PPPoA), support for RFC 2684 bridged and routed encapsulation, IP anti spoofing operation, DiffServ per hop behavior, compatibility with overlapping IP address spaces, support for IP address allocation per service I.S.O. per Access Node, hairpin blocking operation and not requiring IP—Subnet address range per residential router.

In one embodiment of the present invention, an access node configured for facilitating residential routing functionality comprises a virtual local area network (VLAN) identifier exclusively associated with an instance of a residential router and a fixed match forwarding table exclusively populated with host entries learned during residential router authentication or IP address assignment.

In another embodiment of the present invention, a method for facilitating residential routing functionality comprises forwarding upstream traffic dependent upon a virtual local area network (VLAN) identifier designated by the upstream traffic being determined and forwarding downstream traffic dependent upon a host entry designated by the downstream traffic being determined. The VLAN identifier is dedicated to an instance of a residential router and the host entry is provided in a fixed match forwarding table.

In another embodiment of the present invention, a method for configuring an access node to provide residential routing functionality comprises populating a fixed match forwarding table with host entries learned during authentication of or IP address assignment for a residential router instance and then associating the residential router instance exclusively with a respective virtual local area network (VLAN) identifier.

Turning now to specific aspects of the present invention, in at least one embodiment, upstream traffic is forwarded dependent upon the VLAN identifier.

In at least one embodiment of the inventive disclosures made herein, downstream traffic is forwarded dependent upon one of the host entries of the fixed match forwarding table.

In at least one embodiment of the inventive disclosures made herein, at least one logical interface is provided and is configured for being associated with the instance of the residential router, wherein an IP packet received on a VLAN corresponding to the VLAN identifier is limited to being forwarded to one of the logical interfaces.

In at least one embodiment of the inventive disclosures made herein, an IP subnet associated with at least the instance of the residential router is provided.

In at least one embodiment of the inventive disclosures made herein, at least one of the forwarding upstream traffic and the forwarding downstream traffic includes precluding VLAN-to-VLAN communication.

In at least one embodiment of the inventive disclosures made herein, at least one of the forwarding upstream traffic and the forwarding downstream traffic includes exclusively forwarding packets received on a VLAN associated with the VLAN identifier to a logical interface configured for being associated with the instance of a residential router.

In at least one embodiment of the inventive disclosures made herein, an operation is performed for creating a VLAN-specific IP forwarding table, wherein the VLAN identifier and the host entries are accessible from the VLAN-specific IP forwarding table.

In at least one embodiment of the inventive disclosures made herein, forwarding the upstream traffic includes ignoring a designated destination IP address of an IP packet and forwarding the IP packet toward a default gateway dependent upon the host entry.

These and other objects and embodiments of the inventive disclosures made herein will become readily apparent upon further review of the following specification and associated drawings.

DETAILED DESCRIPTION OF PREFERRED EMBODIMENTS

Facilitating residential routing functionality in accordance with the present invention includes suitably configuring an access node through which such residential routing functionality is facilitated. In one embodiment, being suitably configured includes designating a VLAN (virtual local area network) identifier of the service VLAN, enabling Proxy ARP (address resolution protocol) function for the designated VLAN, creating a VLAN specific IP (Internet protocol) forwarding table, creating a respective static route for all upstream traffic to point to a particular service edge router, providing suitable subscriber management, configuring DiffServ (Differentiated Services) marking rules and implementing connection profile configured for subscribed users to create a PVC (permanent virtual connection) from CPE (customer premise equipment) to residential routing delivery point in access node. Where residential routing functionality is being set-up to allow for user auto-configuration with DHCP (dynamic host configuration protocol), a DHCP server address is provided for and DHCP relay function with option 82 is enabled. Where residential routing functionality is being set-up to allow for users to connect with PPP (point-to-point protocol), PPP termination function and radius client function are enabled and radius server configuration information are specified.

With the access node suitably configured, a residential routing subscriber is then ready to implement a subscriber connection phase. The specific aspects of the subscriber connection phase depend of the type of host communication protocol. DHCP and PPP are two examples of different types of host communication protocols.

FIGS. 1A through 1D depict an embodiment of a method for facilitating user connection in accordance with the present invention (generally referred to as method 100), which is specifically configured for facilitating such user connection under DHCP. The method 100 begins with an operation 102 being performed by customer premise-equipment (CPE) for issuing a discovery message to facilitate discovery of a host server (i.e., the DHCP server). In response to an access node performing an operation 104 for receiving the discovery message, an operation 106 is performed by the access node for redirecting the discovery message to DHCP relay function of the access node. Next, an operation 108 is performed by the access node for adding Option 82 information added to the discovery message, thereby creating a modified discovery message. An operation 110 is then performed by the access node for forwarding the modified discovery message for reception by a DHCP server. The modified discovery message is forwarded to the DHCP server as, for example, unicast or broadcast).

Option 82 information enables the DHCP relay function to include information about itself when forwarding client-originated DHCP packets to a DHCP server. The DHCP server can use this information to implement IP address or other parameter-assignment policies. In the depicted embodiment, the access node strips the Option 82 information from downstream traffic (i.e., traffic flowing toward the CPE).

In response to the DHCP server performing an operation 112 for receiving the modified discovery message, the DHCP server performs an operation 114 for issuing an offer message for reception by the CPE. The offer message issued by the DHCP server serves to offer hosting service by the DHCP server to the CPE and includes corresponding Option 82 information. The access node then performs an operation 116 for receiving the offer message, followed by an operation 118 for directing the offer message to the DHCP relay function and an operation 120 for stripping the Option 82 information from the offer message. Stripping the Option 82 information creates a modified offer message. The access node performs an operation 122 for forwarding the modified offer message for reception by the CPE.

In response to the CPE performing an operation 124 for receiving the modified offer message, the CPE performs an operation 126 for issuing a request message for reception by the DHCP server. The request message issued by the DHCP server serves to request hosting service of the DHCP server. The access node then performs an operation 128 for receiving the request message, followed by an operation 130 for directing the request message to the DHCP relay function and an operation 132 for adding Option 82 information to the request. Adding the Option 82 information creates a modified request message. The access node performs an operation 134 for forwarding the modified request message for reception by the access node. The modified request message is forwarded to the DHCP server as, for example, unicast or broadcast).

In response to the DHCP server performing an operation 136 for receiving the modified request message, the DHCP server performs an operation 138 for initiating requested hosting service, followed by an operation 140 for issuing an acknowledgement message for reception by the CPE. The acknowledgement message issued by the DHCP server serves to notify the CPE that the requested hosting service has been initiated and includes corresponding Option 82 information. The access node then performs an operation 142 for receiving the acknowledgement message, followed by an operation 144 for directing the acknowledgement message to the DHCP relay function and an operation 146 for stripping the Option 82 information from the acknowledgement message. Stripping the Option 82 information creates a modified acknowledgement message. The access node performs an operation 122 for forwarding the modified offer message for reception by the CPE. The access node performs an operation 148 for creating a fixed match host entry for the DHCP server and CPE in a downstream forwarding table of the access node and performs an operation 150 for creating a MAC address/IP address association in an ARP table of the access node. A MAC address is an identifier that is unique to a local area network card, which is usually programmed into the card during its manufacture. The MAC address/IP address association enables proxy-ARP functionality and IP anti-spoofing functionality. After stripping the Option 82 information, the access node performs an operation 152 for forwarding the modified acknowledgement for reception by the CPE.

Figure 1A:
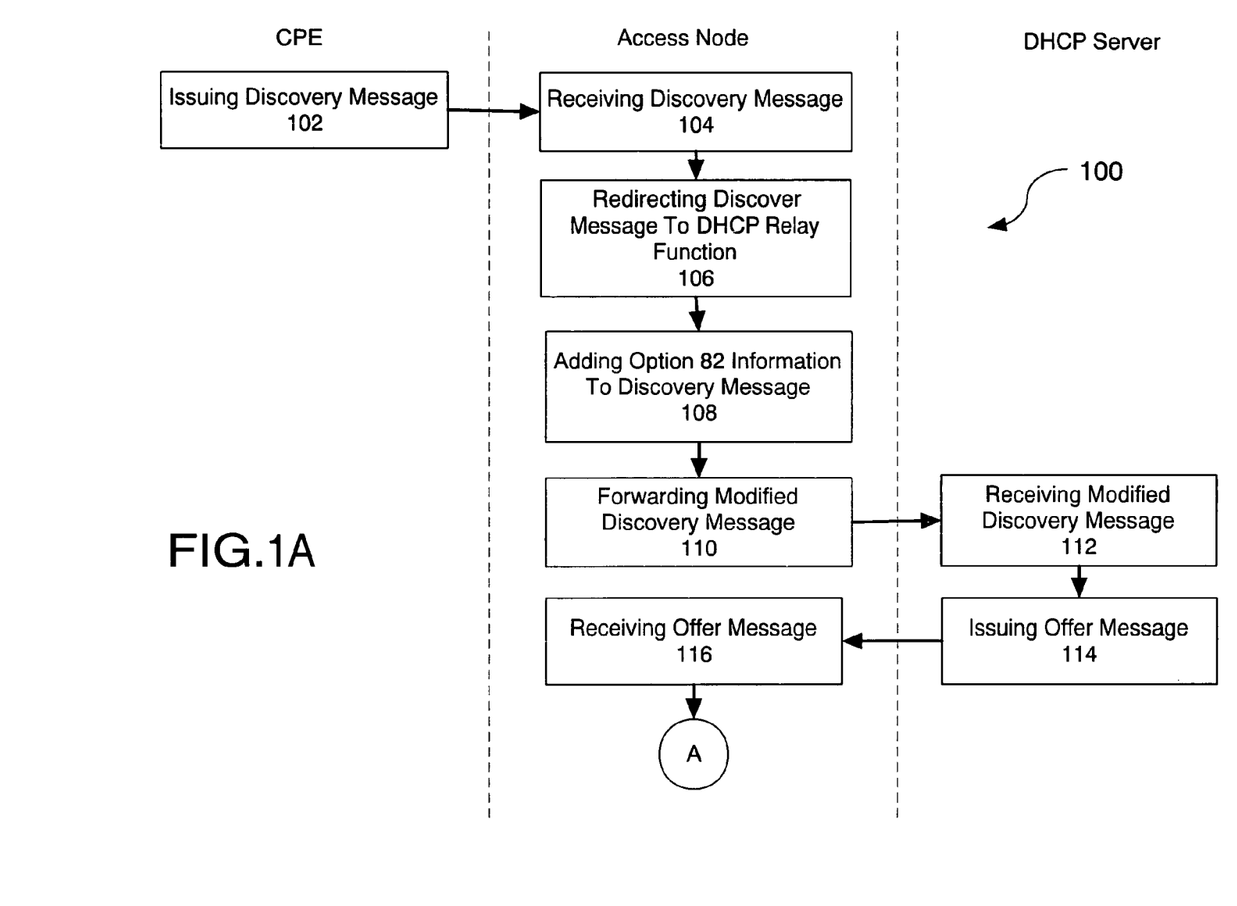
FIGS. 1A through 1D depict an embodiment of a method for facilitating user connection in accordance with the present invention, which is specifically configured for facilitating such user connection under dynamic host configuration protocol.
Figure 1B:
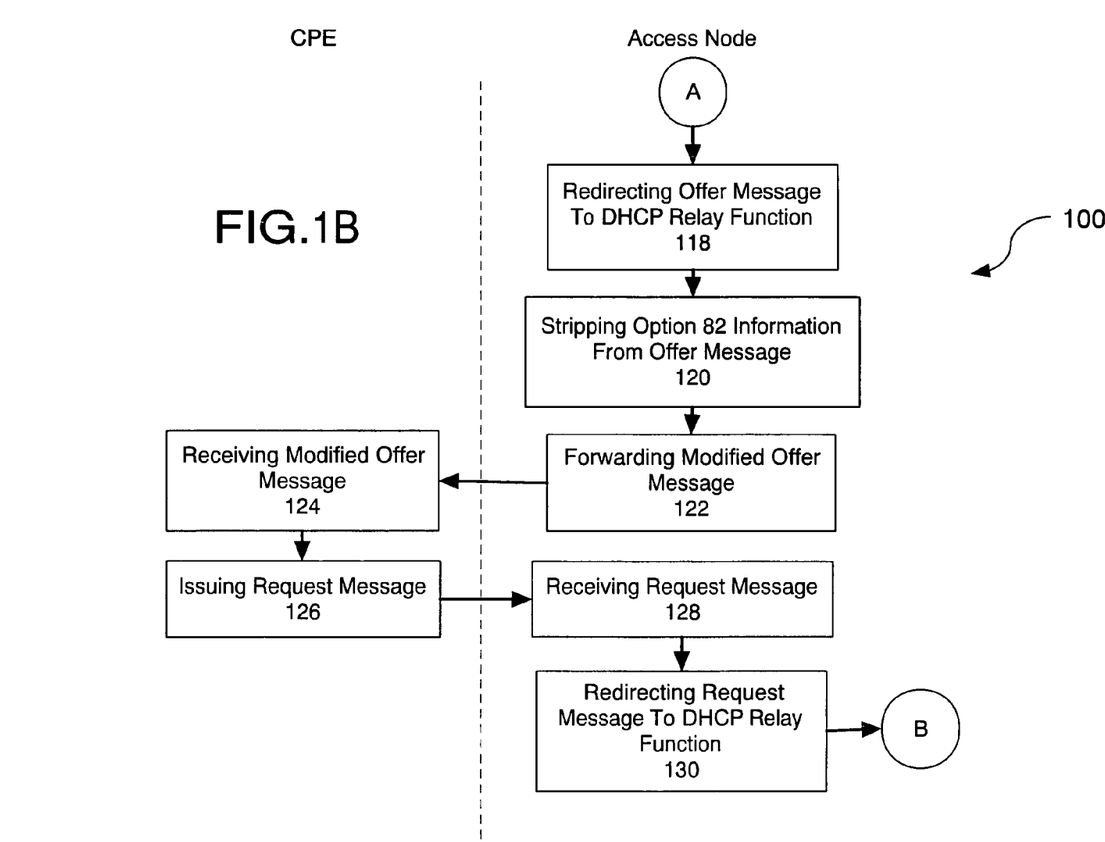
Figure 1C:
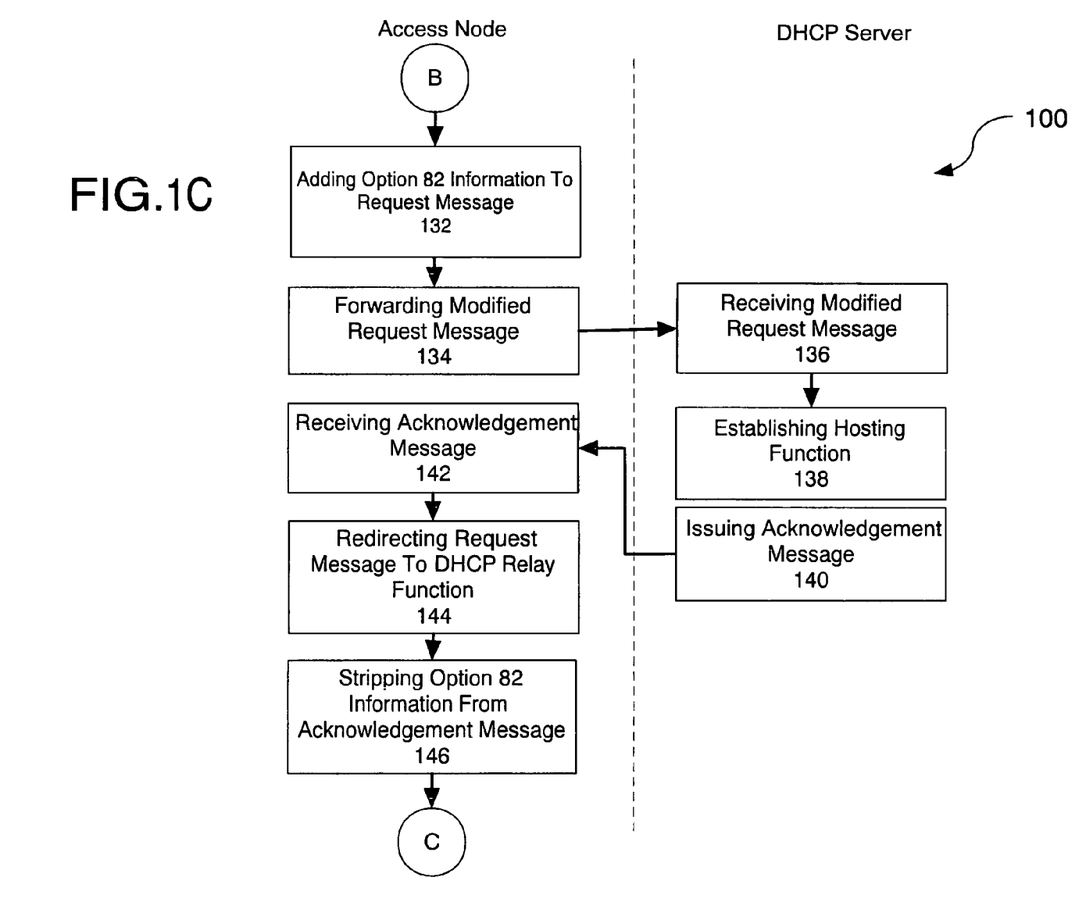
Figure 1D:
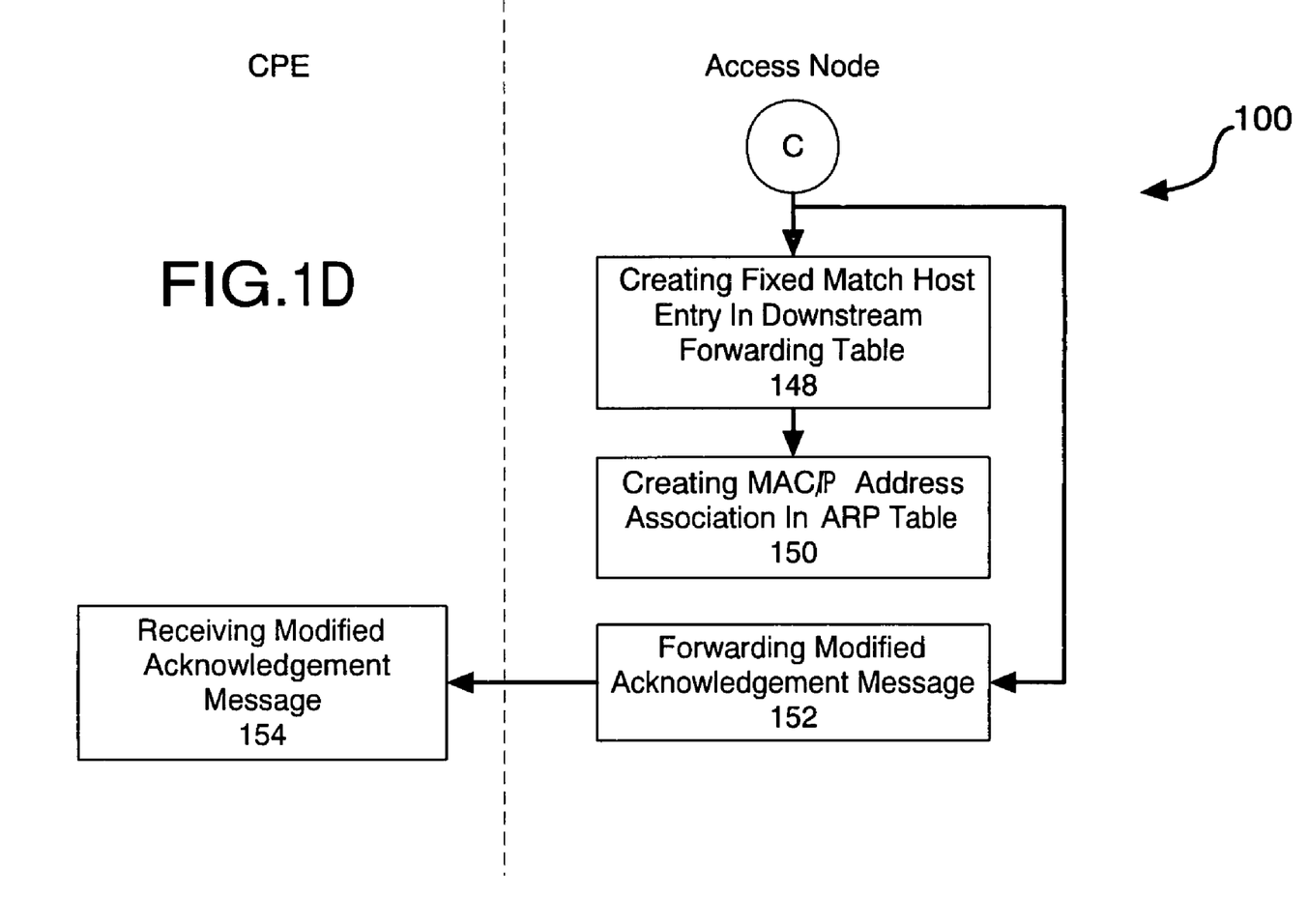
Figure 2A:
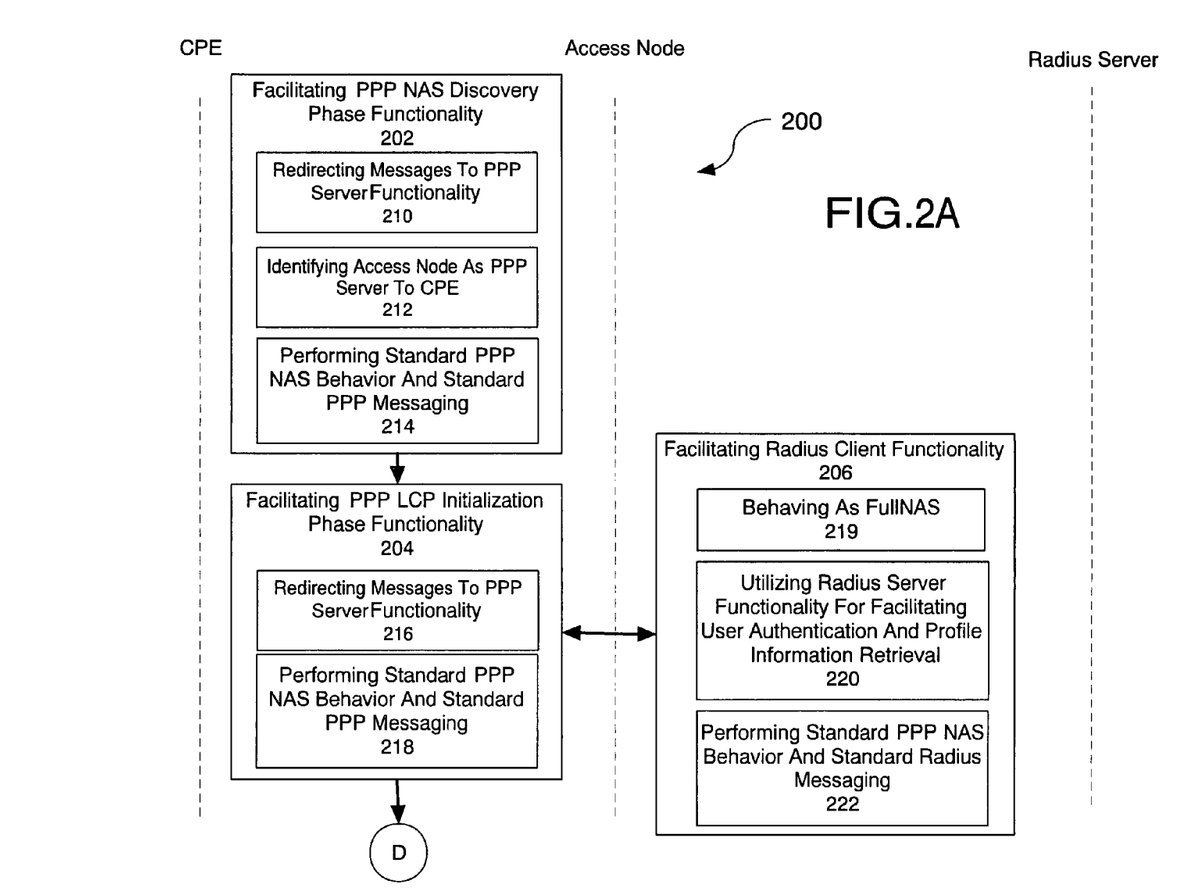
FIGS. 2A and 2B depict an embodiment of a method for facilitating user connection in accordance with the present invention, which is specifically configured for facilitating such user connection under pint-to-point protocol.
Figure 2B:
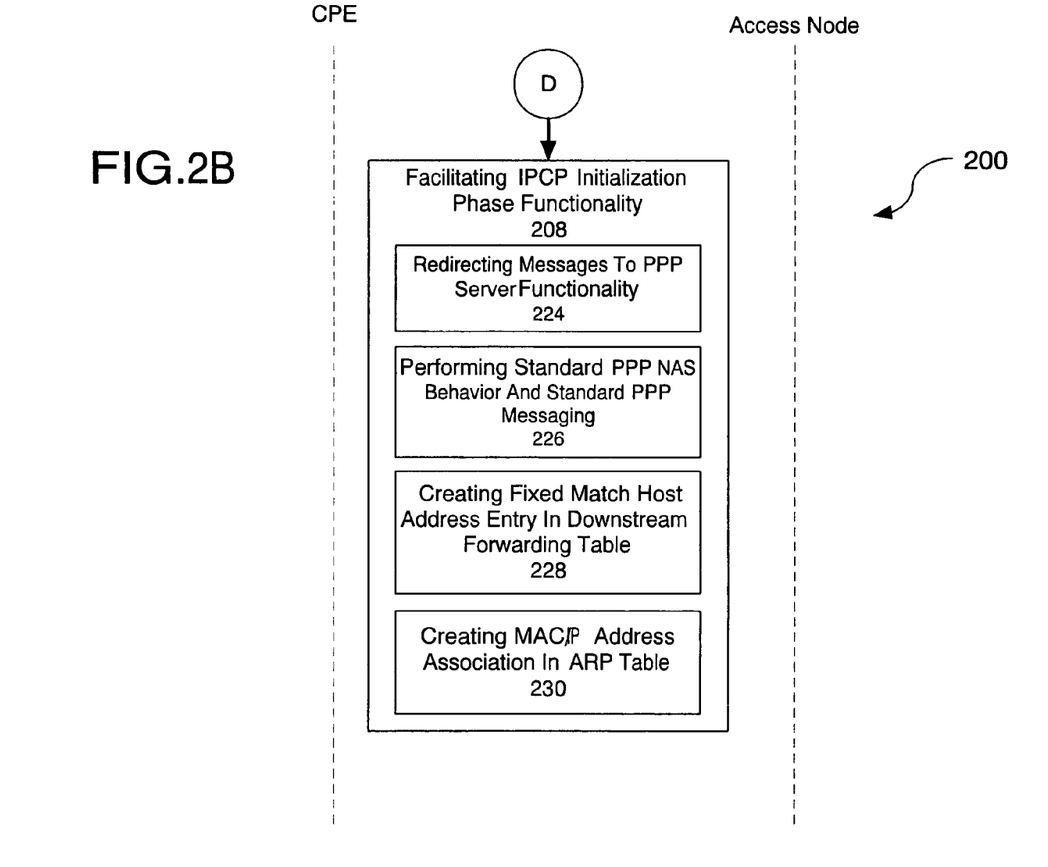

FIGS. 2A and 2B depict an embodiment of a method for facilitating user connection in accordance with the present invention (generally referred to as method 200), which is specifically configured for facilitating such user connection under PPP. The method 200 begins with a CPE and access node jointly performing a process 202 for facilitating PPP NAS (Network Access Server) discovery phase functionality. In response to facilitating the PPP NAS discovery phase functionality, the CPE and the access node jointly performing a process 204 for facilitating PPP LCP (Link Control Protocol) initialization phase functionality. In conjunction with the PPP LCP initialization phase functionality being facilitated, the access node and a radius server jointly perform a process 206 for facilitating radius client functionality. After performing the processes for facilitating PPP LCP initialization phase functionality and the radius client functionality, the CPE and the access node jointly perform a process 208 for facilitating IPCP (Internet Protocol Control Protocol) initialization phase functionality.

In one embodiment of the present invention, facilitating PPP NAS (Network Access Server) discovery phase functionality includes an operation 210 for redirecting messages to PPP server functionality of the access node and operation 212 for identifying the access node as the PPP server for the CPE and an operation 214 performing standard PPP NAS behavior and standard PPP messaging. In one embodiment of the present invention, facilitating PPP LCP initialization phase functionality includes an operation 216 for redirecting messages to PPP server functionality and an operation 218 for performing standard PPP NAS behavior and standard PPP messaging. In one embodiment of the present invention, facilitating radius client functionality includes an operation 219 for providing full NAS functionality, an operation 220 for utilizing radius server functionality for facilitating user authentication and profile information retrieval and an operation 222 for performing standard PPP NAS behavior and standard PPP messaging. In one embodiment of the present invention, facilitating IPCP initialization phase functionality includes an operation 224 for redirecting messages to PPP server functionality of the access node, an operation 226 for performing standard PPP NAS behavior and standard PPP messaging, an operation 228 for creating a fixed match host entry for the radius and CPE in a downstream forwarding table of the access node and pan operation 230 for creating a MAC address/IP address association in an ARP table of the access node.

Figure 3A:
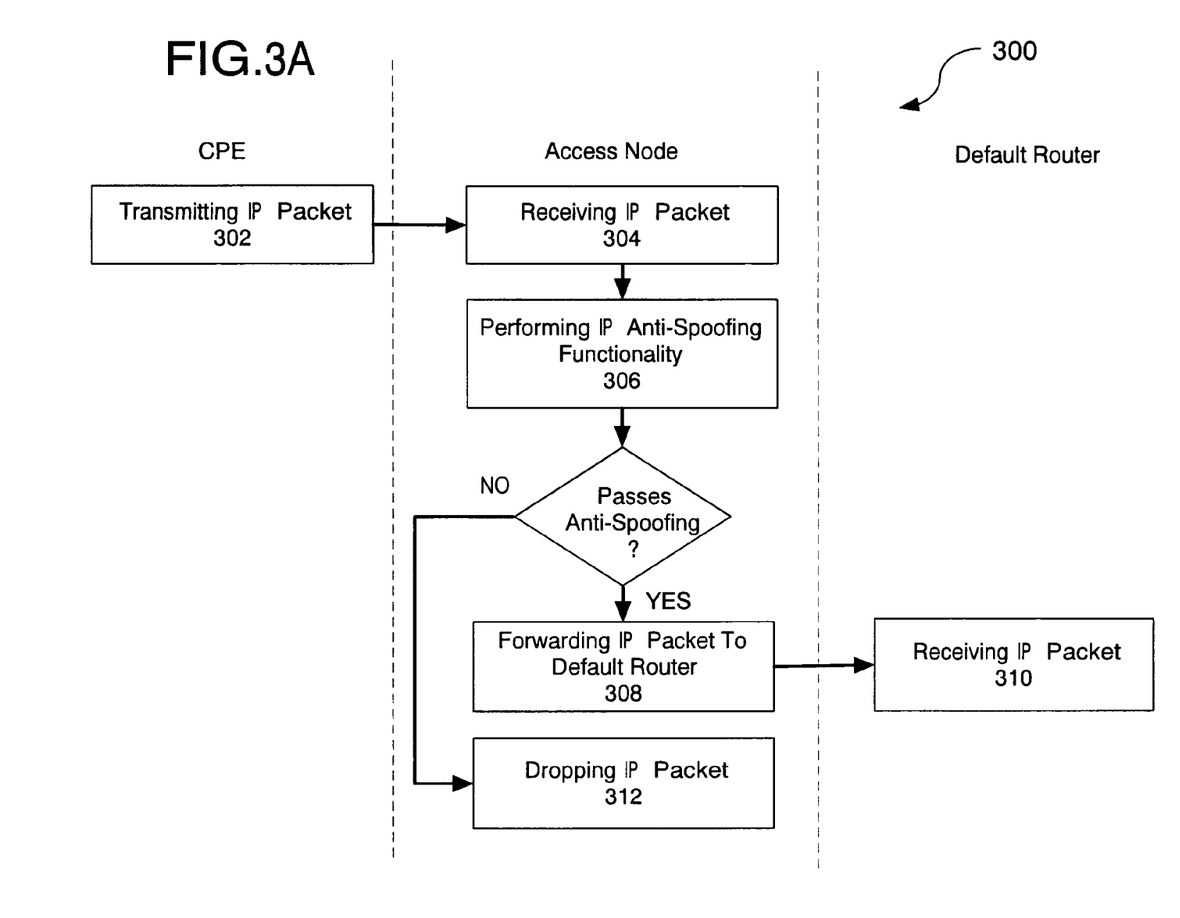
FIG. 3A depicts an embodiment of a method for facilitating upstream IP forwarding behavior in accordance with the present invention.
Figure 3B:
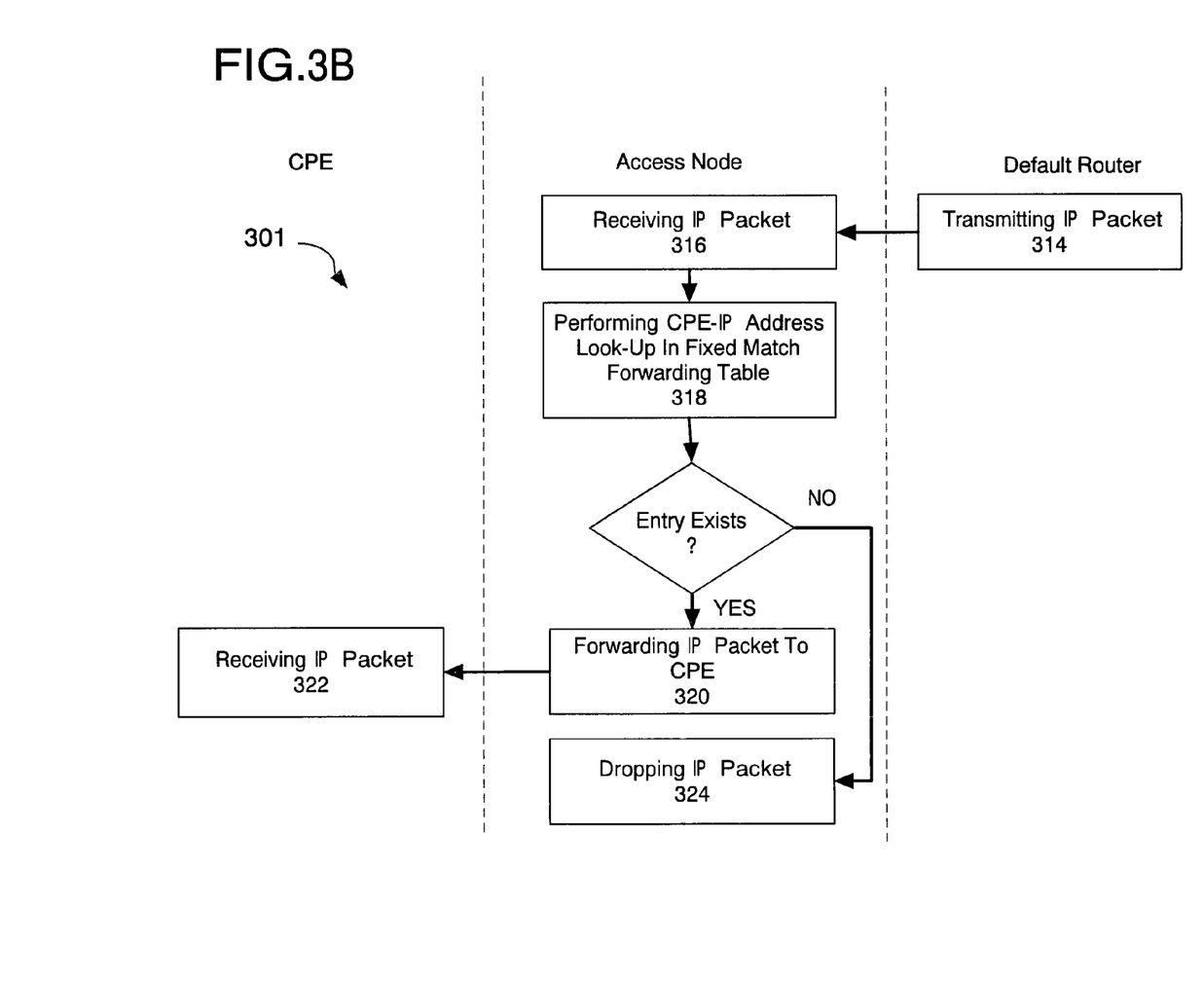
FIG. 3B depicts an embodiment of a method for facilitating upstream IP forwarding behavior in accordance with the present invention.

Referring to FIGS. 3A and 3B, an embodiment of a method for facilitating upstream IP forwarding behavior in accordance with the present invention (generally referred to as method 300) is depicted in FIG. 3A and an embodiment of a method for facilitating upstream IP forwarding behavior in accordance with the present invention (generally referred to as method 301) is depicted in FIG. 3B. Referring first to the method 300 for facilitating upstream IP forwarding behavior (FIG. 3A), the CPE performs an operation 302 for transmitting an IP packet for reception by a designated default router. An access node performs an operation 304 for receiving the IP packet and then performs an operation 306 for performing IP anti-spoofing functionality (e.g., an anti-spoofing filter). In response to the IP packet successfully passing the anti-spoofing functionality, the access node performs an operation for forwarding the IP packet to the default router and the default router subsequently performs an operation 310 for receiving the IP packet. Where an IP packet successfully passing the anti-spoofing functionality, the IP packet is always forwarded to the default router even if the IP packet belongs to the same IP subnet as source or destination in the downstream forwarding table, thereby precluding a hairpinning situation. This default router could be part of a network side VLAN in which case we encapsulate the packet with a PVLAN (Provider VLAN). In response to the IP packet not successfully passing the anti-spoofing functionality, the access node performs an operation 312 for dropping the IP packet. If DiffServ marking is configured perform marking rule and schedule IP packet accordingly. Additionally, the residential router functionality includes validating the user packet based on learned 2 or 3 tuple (PVC, MAC address (if available), IP) to prevent IP and MAC spoofing.

Referring now to the method 301 for facilitating downstream IP forwarding behavior (FIG. 3B), the default router performs an operation 314 for transmitting an IP packet for reception by the CPE. The access node performs an operation 316 for receiving the IP packet and then performs an operation 318 for performing CPE-IP address look-up in a corresponding fixed match forwarding table (e.g., the fixed match forwarding table created in associated with FIG. 1 or 2). In response to the CPE-IP address existing in the fixed match forwarding table, the access node performs an operation 320 for forwarding the IP packet to the CPE via a subscriber logical interface and the CPE subsequently performs an operation 322 for receiving the IP packet. Examples of such a logical interface include, but are not limited to, ATM PVC, or a DSL port, or a logical port on the GPON, or a VLAN identifier on Ethernet framed DSL technology. In one embodiment, the logical interface is associated with a PVLAN (private virtual local area network). In response to the CPE-IP address does not existing in the fixed match forwarding table, the access node performs an operation 324 for dropping the IP packet. Accordingly, forwarding decisions are based on full host address fixed match (/32) within VLAN context and scheduling of IP packet forwarding is preferably, but not necessarily, based on DiffServ codepoint.

Figure 4A:
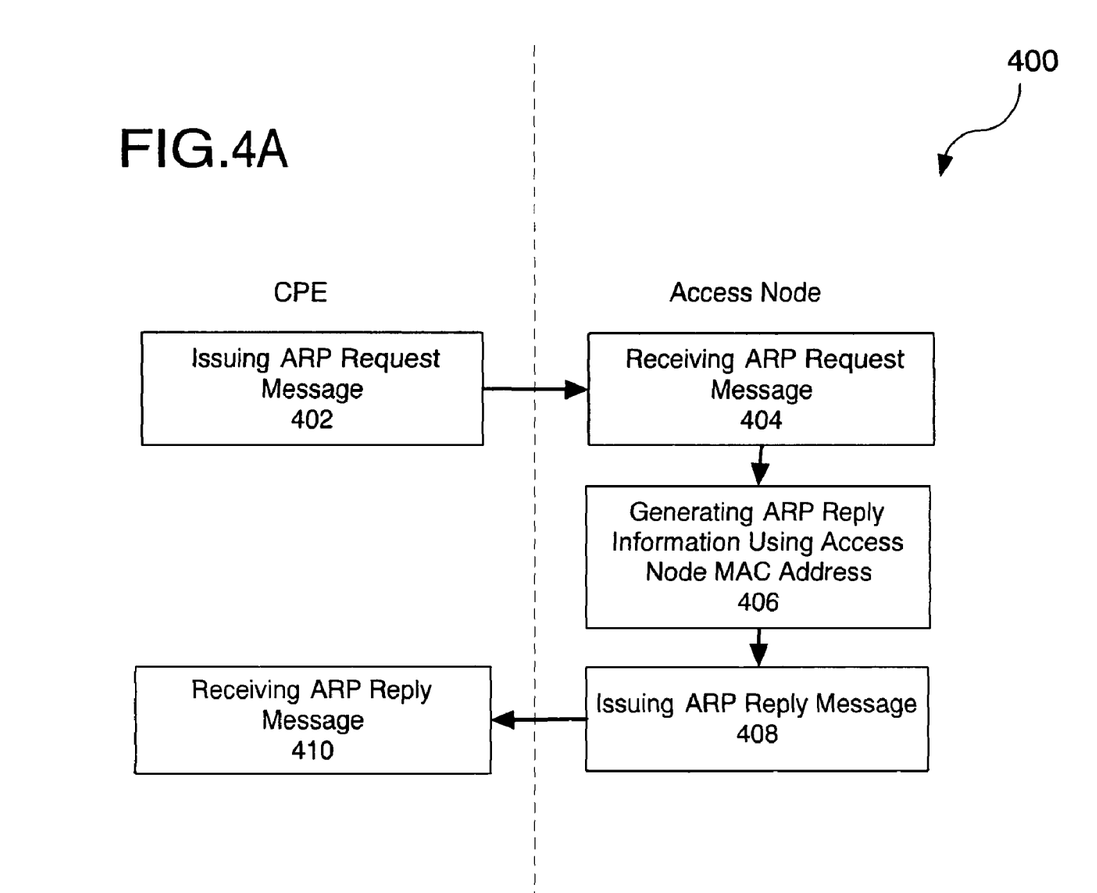
FIG. 4A depicts an embodiment of a method for facilitating Proxy ARP functionality between a CPE and an access node in accordance with the present invention.
Figure 4B:
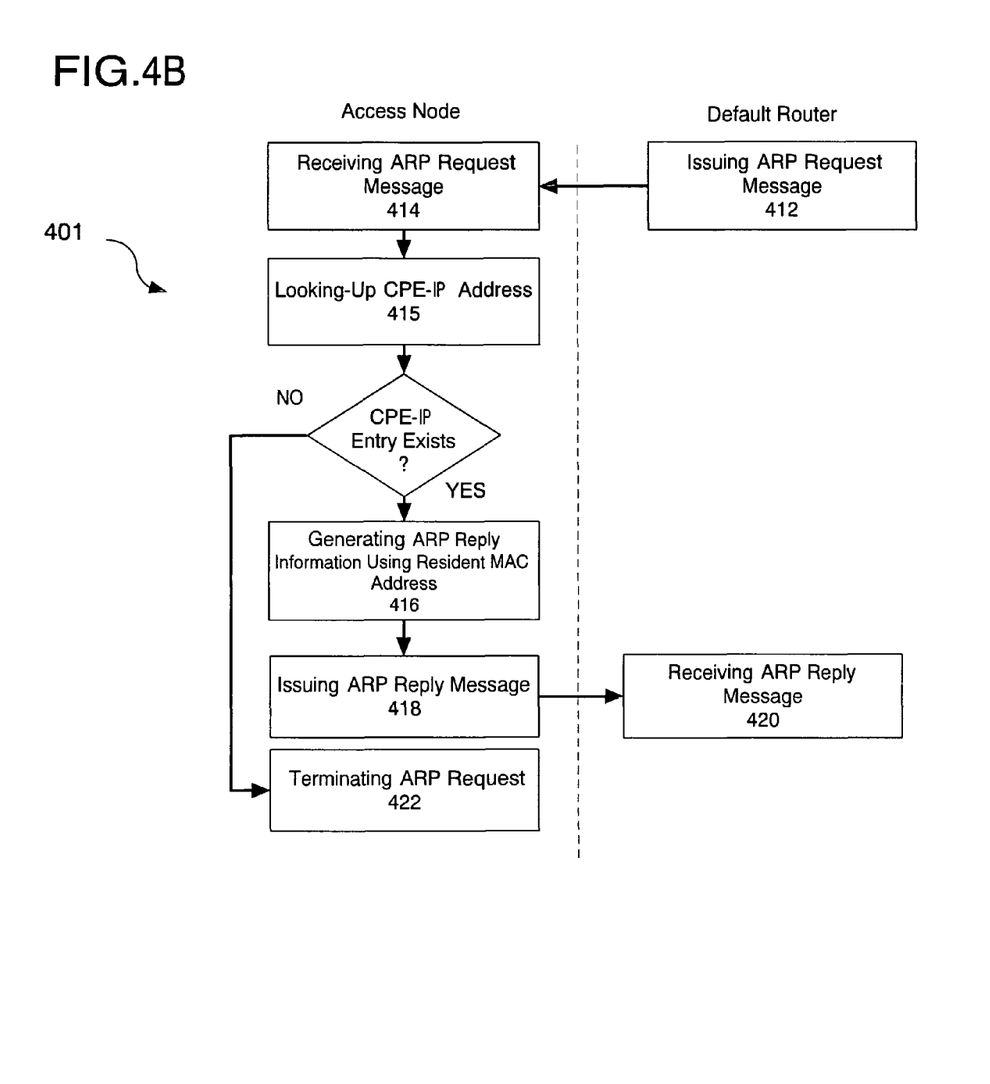
FIG. 4B depicts an embodiment of a method for facilitating Proxy ARP functionality between a default router and access node in accordance with the present invention.

Referring to FIGS. 4A and 4B, an embodiment of a method for facilitating Proxy ARP functionality between a CPE and an access node in accordance with the present invention (generally referred to as method 400) is depicted in FIG. 4A and an embodiment of a method for facilitating Proxy ARP functionality between a default router and access node in accordance with the present invention (generally referred to as method 401) is depicted in FIG. 4B. Referring first to the method 400 for facilitating Proxy ARP functionality between the CPE and the access node (FIG. 4A), an operation 402 for issuing an ARP request message for reception by the access node. In response to the access node performing an operation 404 for receiving the ARP message, the access node performs an operation 406 for generating ARP reply information to the CPE with the access node MAC address. The access node generates the ARP reply information using standard Proxy ARP behavior. After generating the ARP reply information, the access node performs an operation 408 for issuing an ARP reply message for reception by the CPE and the CPE subsequently performs an operation 410 for receiving the ARP reply message. The ARP reply message includes respective portions of the ARP reply information.

Referring now to the method 401 for facilitating Proxy ARP functionality between a default router and access node (FIG. 4B), the default router performs an operation 412 for issuing an ARP request message for reception by the access node. In response to the access node performing an operation 414 for receiving the ARP request message, the access node performs an operation 415 for looking up a CPE-IP address designated in the ARP request message in a Proxy ARP table. If an entry corresponding to the designated CPE-IP address entry exists, the access node performs an operation 416 for generating an ARP reply message to the default router with it's own MAC address, followed by issuing the ARP reply message for reception by the default router. The default router then performs an operation 420 for receiving the ARP reply message. If the entry corresponding to the designated CPE-IP address entry does not exists, the access node performs an operation 422 for terminating the ARP request (e.g., taking no further action). The method 401 is carried out using standard Proxy ARP behavior.

With the introduction of Ethernet as an aggregation network technology for broadband access nodes, new network deployment models emerge. Clearly giving the aggregation nature of a access node a deployment model were subscriber traffic for a specific service is aggregated on a per service VLAN is a key requirement. Residential routing (i.e., residential access routing) in accordance with the present invention is a scheme that implements the VLAN per service model while ensuring fundamental security requirements typical for a residential broadband access environment.

In view of behavior associated with conventional residential access bridging that is provided in the access devices such as a DSLAM (Digital Subscriber Line Access Mutliplexer) or an OLT (Optical Line Terminal), there are a number of limitations with conventional access solutions that use layer 2 bridging, which are overcome by residential routing facilitated in accordance with the present invention. One example of such a limitation is that conventional access solutions do not reduce the number of MAC addresses present in the Ethernet network, which can pose significant problems if an associated FTTU (Fiber-To-The-User) or DSLAM based network grows beyond a certain limit. Another example of such a limitation is that conventional access solutions are limited in their ability to implement intelligent RGW (Residential Gateway) with IP address based service selection. Still another example of such a limitation is that, while IP CoS (Class of Service) and Ethernet CoS can be interpreted equivalently, conventional residential routing solutions do not readily provide for intelligent drop mechanisms (and hence notification of in-band drop precedence in the data streams) and therefore do not strengthen the case for useful and advantageous IP CoS techniques.

The basic goal of residential routing functionality in accordance with the present invention is to provide an access solution that can work at Layer 3 level. By being the first layer 3 aware device on the customer side, an access node providing residential router functionality in accordance with the present invention provides security features such as limiting the L2 broadcast storms, avoiding security threats such as MAC address spoofing and IP address spoofing. Accordingly, an important factor is that residential router functionality in accordance with the present invention has integral customer-based knowledge that enhances security scalability functionality.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An access node configured for facilitating residential routing functionality, comprising:

a virtual local area network (VLAN) identifier exclusively associated with an instance of a residential router used to direct traffic to a default router;

a fixed match forwarding table formed through an operation at the access node and exclusively populated with host entries learned during at least one of residential router authentication and IP address assignment utilized for transmitting traffic from the default router to the residential router; and an ARP table containing MAC address/IP address associations wherein the access node receives an ARP request from the default router, checks the ARP table to discover if an IP address of the residential router exists, and if it does exist, generates an ARP reply message to the default router using a MAC address of the access node, and if it does not exist, terminates the ARP request by taking no further action and further comprising:

at least one logical interface configured for being associated with the instance of the residential router; and an IP subnet associated with at least the instance of the residential router, wherein an IP packet received on a VLAN corresponding to the VLAN identifier is limited to being forwarded to one of said logical interfaces;

wherein upstream traffic is forwarded dependent upon the VLAN identifier; and wherein downstream traffic is forwarded dependent upon one of said host entries of the fixed match forwarding table.

2. A method for facilitating residential routing functionality, comprising:

forwarding upstream traffic dependent upon a virtual local area network (VLAN) identifier designated by said upstream traffic being determined, wherein the VLAN identifier is dedicated to an instance of a residential router;

forwarding downstream traffic dependent upon a host entry designated by said downstream traffic being determined, wherein the host entry is provided in a fixed match forwarding table formed through an operation at an access node; and utilizing an ARP table to perform proxy-ARP functionality on downstream traffic wherein the access node receives an ARP request from a default router, checks the ARP table to discover if an IP address of the residential router exists, and if it does exist, generates an ARP reply message to the default router using a MAC address of the access node, and if it does not exist, terminates the ARP request by taking no further action and anti-spoofing functionality on upstream traffic wherein upstream traffic is sent from the access node onto the default router when an anti-spoofing test is passed and upstream traffic is dropped when the anti-spoofing test is failed and further comprising:

creating a VLAN-specific IP forwarding table, wherein the VLAN identifier and said host entries are accessible from the VLAN-specific IP forwarding table; wherein at least one of said forwarding upstream traffic and said forwarding downstream traffic includes precluding VLAN-to-VLAN communication;

wherein at least one of said forwarding upstream traffic and said forwarding downstream traffic includes exclusively forwarding packets received on a VLAN associated with the VLAN identifier to a logical interface configured for being associated with the instance of a residential router; and wherein forwarding said upstream traffic includes ignoring a designated destination IP address of an IP packet and forwarding said IP packet toward a default gateway dependent upon the host entry.

3. A method for configuring an access node to provide residential routing functionality, comprising:

populating a fixed match forwarding table formed through an operation at the access node with host entries learned during at least one of authentication of a residential router instance and IP address assignment for the residential router instance wherein the access node receives an ARP request from a default router, checks an ARP table to discover if an IP address of the residential router instance exists, and if it does exist, generates an ARP reply message to the default router using a MAC address of the access node, and if it does not exist, terminates the ARP request by taking no further action; and associating the residential router instance exclusively with a respective virtual local area network (VLAN) identifier which is used to direct traffic to the default router and further comprising:

forwarding downstream traffic dependent upon a host entry designated by said downstream traffic being determined; and forwarding upstream traffic dependent upon a virtual local area network (VLAN) identifier designated by said upstream traffic being determined;

wherein the host entry is accessed from within the fixed match forwarding table;

wherein the VLAN identifier is dedicated to the residential router instance;

wherein said forwarding upstream traffic includes exclusively forwarding packets received on a VLAN associated with the VLAN identifier to a logical interface configured for being associated with the residential router instance; and wherein said forwarding upstream traffic includes ignoring a designated destination IP address of an IP packet and forwarding said IP packet toward a default gateway dependent upon the host entry.

4. The method of claim 3, further comprising:
providing at least one logical interface associated with the residential router instance, wherein an IP packet received on a VLAN corresponding to the VLAN identifier is limited to being forwarded to one of said logical interfaces.

5. The method of claim 3, further comprising:
providing an IP subnet associated with at least the residential router instance.

6. The method of claim 3, further comprising:
providing at least one logical interface associated with the residential router instance, wherein an IP packet received on a VLAN corresponding to the VLAN identifier is limited to being forwarded to one of said logical interfaces; and providing an IP subnet associated with at least the residential router instance.

* * * * *